(12) United States Patent
Duquesne et al.

(10) Patent No.: US 10,398,085 B2
(45) Date of Patent: Sep. 3, 2019

(54) DRIVE ARM FOR AGRICULTURAL HARVESTER

(71) Applicant: CNH Industrial America LLC, New Holland, PA (US)

(72) Inventors: Frank R. G. Duquesne, Zwevegem (BE); Curtis F. Hillen, Lititz, PA (US); Dieter Neirynck, Roeselare (BE); Daniel T. Turner, Lititz, PA (US); Bart Derynck, Aartrijke (BE); Karl R. Linde, Leola, PA (US); Raf De Smet, Nieuwpoort (BE)

(73) Assignee: CNH Industrial America LLC, New Holland, PA (US)

(*) Notice: Subject to any disclaimer, the term of this patent is extended or adjusted under 35 U.S.C. 154(b) by 291 days.

(21) Appl. No.: 15/298,060

(22) Filed: Oct. 19, 2016

(65) Prior Publication Data

US 2017/0112067 A1    Apr. 27, 2017

Related U.S. Application Data

(60) Provisional application No. 62/245,625, filed on Oct. 23, 2015.

(51) Int. Cl.
| *A01F 12/32* | (2006.01) |
| *B07B 1/00* | (2006.01) |
| *A01F 12/56* | (2006.01) |
| *A01F 12/44* | (2006.01) |

(52) U.S. Cl.
CPC .............. *A01F 12/56* (2013.01); *A01F 12/44* (2013.01); *A01F 12/446* (2013.01); *A01F 12/448* (2013.01)

(58) Field of Classification Search
CPC .. A01D 75/282; A01D 41/1276; A01D 41/00; A01D 41/12; A01F 12/448; A01F 12/32; A01F 12/44; A01F 12/446; A01F 12/00; B07B 1/42; B07B 1/46

See application file for complete search history.

(56) References Cited

U.S. PATENT DOCUMENTS

| 2,262,453 | A | * | 11/1941 | Dray | ..................... A01D 41/00 |
| | | | | | 460/119 |
| 2,939,581 | A | * | 6/1960 | Ashton | ................... A01F 12/44 |
| | | | | | 209/26 |
| 4,344,443 | A | * | 8/1982 | De Busscher | ....... A01D 75/282 |
| | | | | | 460/150 |
| 4,355,647 | A | | 10/1982 | Heidjann et al. | |

(Continued)

FOREIGN PATENT DOCUMENTS

| DE | 9113652 U1 | 1/1992 | |
| EP | 2008507 A1 | 12/2008 | |
| SU | 240363 A * | 1/1978 | ............. A01D 41/12 |

OTHER PUBLICATIONS

European Search Report; 16195117.3-1656; dated Mar. 10, 2017.

*Primary Examiner* — Arpad Fabian-Kovacs
(74) *Attorney, Agent, or Firm* — Patrick M. Sheldrake

(57) ABSTRACT

An agricultural harvester includes a grain processing section having a sieve assembly. The sieve assembly is driven in fore and aft oscillation by an eccentric rotation device while permitting side to side movement. A drive arm to the sieve assembly has a connection interface to the eccentric rotation device permitting side to side movement during fore and aft oscillation.

6 Claims, 3 Drawing Sheets

(56) References Cited

U.S. PATENT DOCUMENTS

| | | | | |
|---|---|---|---|---|
| 4,535,788 A * | 8/1985 | Rowland-Hill | A01D 75/282 | 209/416 |
| 4,548,214 A * | 10/1985 | Sheehan | A01D 75/282 | 460/9 |
| 4,557,276 A * | 12/1985 | Hyman | A01D 75/285 | 209/416 |
| 4,598,718 A * | 7/1986 | Glaubitz | A01D 75/282 | 209/416 |
| 4,897,071 A * | 1/1990 | Desnijder | A01D 75/282 | 460/10 |
| 6,672,957 B2 * | 1/2004 | Voss | A01F 12/448 | 460/101 |
| 7,322,882 B2 | 1/2008 | Duquesne et al. | | |
| 7,927,199 B2 | 4/2011 | Adamson et al. | | |
| 8,282,453 B1 * | 10/2012 | Hillen | A01F 12/52 | 340/684 |
| 8,622,791 B2 * | 1/2014 | Puvak | A01F 12/32 | 460/101 |
| 8,939,829 B2 | 1/2015 | Murray et al. | | |
| 8,951,105 B2 | 2/2015 | Murray et al. | | |
| 9,258,945 B2 * | 2/2016 | Pearson | A01F 12/446 | |
| 9,622,415 B2 * | 4/2017 | Duquesne | A01F 12/448 | |
| 2005/0282601 A1 * | 12/2005 | Duquesne | A01D 75/282 | 460/101 |
| 2006/0229119 A1 * | 10/2006 | Wamhof | A01D 75/282 | 460/101 |
| 2008/0004092 A1 * | 1/2008 | Nelson | A01F 12/448 | 460/101 |
| 2008/0318650 A1 * | 12/2008 | Dhont | A01D 75/282 | 460/101 |
| 2010/0016044 A1 * | 1/2010 | Adamson | A01F 12/448 | 460/101 |
| 2013/0158816 A1 * | 6/2013 | Murray | A01F 12/448 | 701/50 |
| 2014/0171163 A1 * | 6/2014 | Murray | A01F 12/448 | 460/101 |
| 2014/0179381 A1 * | 6/2014 | Murray | A01F 12/448 | 460/101 |
| 2016/0029562 A1 * | 2/2016 | De Smet | A01F 12/32 | 460/1 |
| 2017/0086380 A1 * | 3/2017 | Walter | A01D 41/12 | |
| 2017/0311547 A1 * | 11/2017 | Fuchs | A01D 41/127 | |

* cited by examiner

DRIVE ARM FOR AGRICULTURAL HARVESTER

This application claims the benefit of U.S. Provisional Patent Application No. 62/245,625, entitled "Drive Arm for Agricultural Harvester Cleaner" and filed Oct. 23, 2015, the contents of which are incorporated herein by reference.

BACKGROUND OF THE INVENTION

1. Field of the Invention

The present invention relates to agricultural harvesters such as combines, and, more particularly, to drive arms incorporated in the harvester crop processing section.

2. Description of the Related Art

An agricultural harvester known as a "combine" is historically termed such because it combines multiple harvesting functions with a single harvesting unit, such as picking, threshing, separating and cleaning. A combine includes a header which removes the crop from a field, and a feeder housing which transports the crop matter into a threshing rotor. The threshing rotor rotates within a perforated housing, which may be in the form of adjustable concaves, and performs a threshing operation on the crop to remove the grain. Once the grain is threshed it falls through perforations in the concaves and is transported to a grain pan. From the grain pan the grain is cleaned using a cleaning system, and is then transported to a grain tank onboard the combine. The cleaning system includes a cleaning fan which blows air through oscillating sieves to discharge chaff and other debris toward the rear of the combine. Non-grain crop material such as straw from the threshing section proceeds through a straw chopper and out the rear of the combine. When the grain tank becomes full, the combine is positioned adjacent a vehicle into which the grain is to be unloaded, such as a semi-trailer, gravity box, straight truck, or the like; and an unloading system on the combine is actuated to transfer the grain into the vehicle.

More particularly, a rotary threshing or separating system includes one or more rotors which can extend axially (front to rear) or transversely within the body of the combine, and which are partially or fully surrounded by a perforated concave. The crop material is threshed and separated by the rotation of the rotor within the concave. Coarser non-grain crop material such as stalks and leaves are transported to the rear of the combine and discharged back to the field. The separated grain, together with some finer non-grain crop material such as chaff, dust, straw, and other crop residue are discharged through the concaves and fall onto the grain pan where they are transported to the cleaning system. Alternatively, the grain and finer non-grain crop material may also fall directly onto the cleaning system itself.

The cleaning system further separates the grain from non-grain crop material, and typically includes a fan directing an air flow stream upwardly and rearwardly through vertically arranged sieves which oscillate in a fore and aft manner. The air flow stream lifts and carries the lighter non-grain crop material towards the rear end of the combine for discharge to the field. Clean grain, being heavier, and larger pieces of non-grain crop material, which are not carried away by the air flow stream, fall onto a surface of an upper sieve (also known as a chaffer sieve or sieve assembly) where some or all of the clean grain passes through to a lower sieve (also known as a cleaning sieve). Grain and non-grain crop material remaining on the upper and lower sieves are physically separated by the reciprocating action of the sieves as the material moves rearwardly. Any grain and/or non-grain crop material remaining on the top surface of the upper sieve or sieve assembly are discharged at the rear of the combine. Grain falling through the lower sieve lands on a bottom pan of the cleaning system, where it is conveyed forwardly toward a clean grain auger.

The clean grain auger is positioned below the lower sieve, and receives clean grain from each sieve and from the bottom pan of the cleaning system. The clean grain auger then augers the clean grain laterally sideways to a clean grain elevator, which in turn conveys the clean grain to a grain tank onboard the combine.

The upper sieve or sieve assembly is driven for fore and aft movement to move the harvested crop material in an aft direction but at the same time separate the remaining grain or crop from the non-crop material. The sieve assembly presents a significant weight having inertia forces that require structurally strong supports to secure the sieve assembly in the agricultural frame but at the same time enable driven fore and aft movement. A further complication arises in that, when the agricultural harvester is on the side of a slope, it requires side to side movement of the sieve assembly so as to prevent clogging of the material and resultant reduction in efficiency. The side to side movement is used generally selectively so that the continuous primary movement is fore and aft but the structural connection must also permit side to side movement of the sieve assembly.

Typically, the drive arm for oscillation must include an additional flexible joint link to permit side to side movement in addition to fore and aft oscillation. This adds additional cost, bulk and complexity to the mechanism.

Accordingly, what is needed in the art is a simplified drive arm that oscillates the sieve assembly in a fore and aft direction and, at the same time, permits side to side movement of the pan.

SUMMARY OF THE INVENTION

The present invention seeks to oscillate a sieve assembly in a fore and aft direction but at the same time permit side to side movement with a compact drive arm.

In one form, the invention is a sieve assembly for an agricultural harvester. The sieve assembly includes a right side member and a left side member interconnected by a cross frame member. Front and rear supports are provided for the right and left side members permitting fore and aft movement and side to side movement. An eccentric rotation device drives fore and aft oscillation of the right and left side frame members. A drive arm is connected to the eccentric rotation device and to each of the right and left side members, the drive arm having a connection interface with the eccentric rotation device permitting side to side movement of the sieve assembly with fore and aft oscillation.

In another form, the invention is an agricultural harvester with a main frame, a plurality of wheels for ground movement and grain processing equipment mounted in the frame. A sieve assembly receives material from the grain processing equipment and includes a right side member and a left side member interconnected by a cross frame member. Front and rear supports for the right and left side members connect to the main frame for permitting fore and aft movement and side to side movement. An eccentric rotation device drives fore and aft oscillation of the right and left side frame members. A drive arm is connected to the eccentric rotation device and to each of the right and left side members, the drive arm having a connection interface with the eccentric rotation device permitting side to side movement of the sieve assembly with fore and aft oscillation.

An advantage of the present invention is a simplified drive arm for the sieve in an agricultural harvester.

Another advantage is a compact mounting for the drive arm while permitting fore and aft and side to side movement.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein.

Corresponding reference characters indicate corresponding parts throughout the several views. The exemplification set out herein illustrates an embodiment of the invention, in one form, and such exemplification is not to be construed as limiting the scope of the invention in any manner.

DETAILED DESCRIPTION OF THE INVENTION

The terms "grain", "straw" and "tailings" are used principally throughout this specification for convenience but it is to be understood that these terms are not intended to be limiting. Thus "grain" refers to that part of the crop material which is threshed and separated from the discardable part of the crop material, which is referred to as non-grain crop material, MOG or straw. Incompletely threshed crop material is referred to as "tailings". Also the terms "forward", "rearward", "left" and "right", when used in connection with the agricultural harvester and/or components thereof are usually determined with reference to the direction of forward operative travel of the harvester, but again, they should not be construed as limiting. The terms "longitudinal" and "transverse" are determined with reference to the fore-and-aft direction of the agricultural harvester and are equally not to be construed as limiting.

Figure 1:
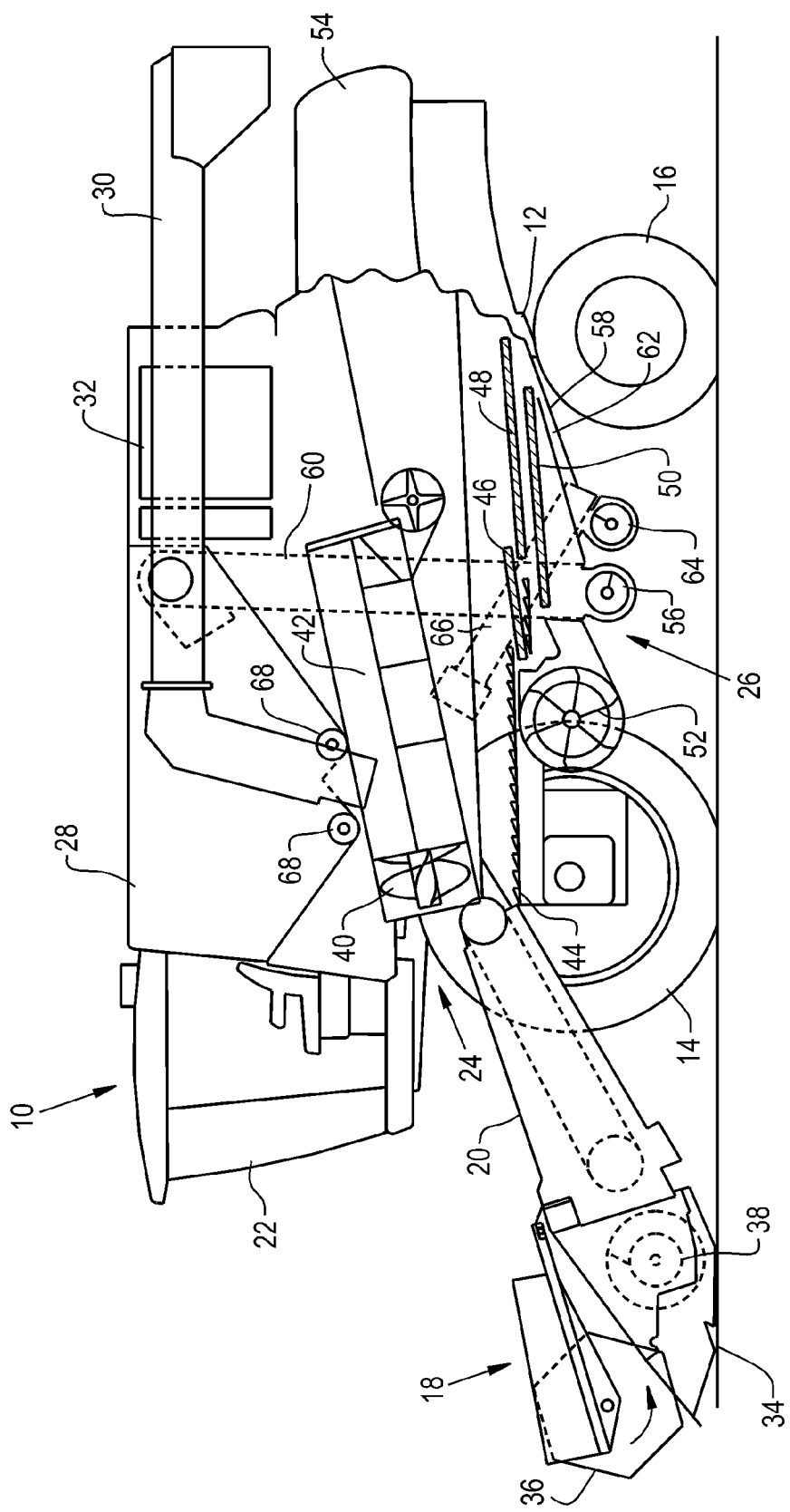
FIG. 1 is a side view of an embodiment of an agricultural harvester in the form of a combine which may include a sieve assembly and drive arm of the present invention.

Referring now to the drawings, and more particularly to FIG. 1, there is shown an agricultural harvester in the form of a combine 10, which generally includes a chassis 12, ground engaging wheels 14 and 16, header 18, feeder housing 20, operator cab 22, threshing and separating system 24, cleaning system 26, grain tank 28, and unloading auger 30.

Front wheels 14 are larger flotation type wheels, and rear wheels 16 are smaller steerable wheels. Motive force is selectively applied to front wheels 14 through a power plant in the form of a diesel engine 32 and a transmission (not shown). Although combine 10 is shown as including wheels, is also to be understood that combine 10 may include tracks, such as full tracks or half tracks.

Header 18 is mounted to the front of combine 10 and includes a cutter bar 34 for severing crops from a field during forward motion of combine 10. A rotatable reel 36 feeds the crop into header 18, and a double auger 38 feeds the severed crop laterally inwardly from each side toward feeder housing 20. Feeder housing 20 conveys the cut crop to threshing and separating system 24, and is selectively vertically movable using appropriate actuators, such as hydraulic cylinders (not shown).

Threshing and separating system 24 is of the axial-flow type, and generally includes a rotor 40 at least partially enclosed by and rotatable within a corresponding perforated concave 42. The cut crops are threshed and separated by the rotation of rotor 40 within concave 42, and larger elements, such as stalks, leaves and the like are discharged from the rear of combine 10. Smaller elements of crop material including grain and non-grain crop material, including particles lighter than grain, such as chaff, dust and straw, are discharged through perforations of concave 42. Threshing and separating system 24 can also be a different type of system, such as a system with a transverse rotor rather than an axial rotor, etc.

Grain which has been separated by the threshing and separating assembly 24 falls onto a grain pan 44 and is conveyed toward cleaning system 26. Cleaning system 26 may include an optional pre-cleaning sieve 46, an upper sieve 48 (also known as a chaffer sieve or sieve assembly), a lower sieve 50 (also known as a cleaning sieve), and a cleaning fan 52. Grain on sieves 46, 48 and 50 is subjected to a cleaning action by fan 52 which provides an air flow through the sieves to remove chaff and other impurities such as dust from the grain by making this material airborne for discharge from straw hood 54 of combine 10. Grain pan 44 and pre-cleaning sieve 46 oscillate in a fore-to-aft manner to transport the grain and finer non-grain crop material to the upper surface of upper sieve 48. Upper sieve 48 and lower sieve 50 are vertically arranged relative to each other, and likewise oscillate in a fore-to-aft manner to spread the grain across sieves 48, 50, while permitting the passage of cleaned grain by gravity through the openings of sieves 48, 50.

Clean grain falls to a clean grain auger 56 positioned crosswise below and toward the front of lower sieve 50. Clean grain auger 56 receives clean grain from each sieve 48, 50 and from bottom pan 58 of cleaning system 26. Clean grain auger 56 conveys the clean grain laterally to a generally vertically arranged grain elevator 60 for transport to grain tank 28. Tailings from cleaning system 26 fall to a tailings auger trough 62. The tailings are transported via tailings auger 64 and return auger 66 to the upstream end of cleaning system 26 for repeated cleaning action. A pair of grain tank augers 68 at the bottom of grain tank 28 convey the clean grain laterally within grain tank 28 to unloading auger 30 for discharge from combine 10.

Figure 2:
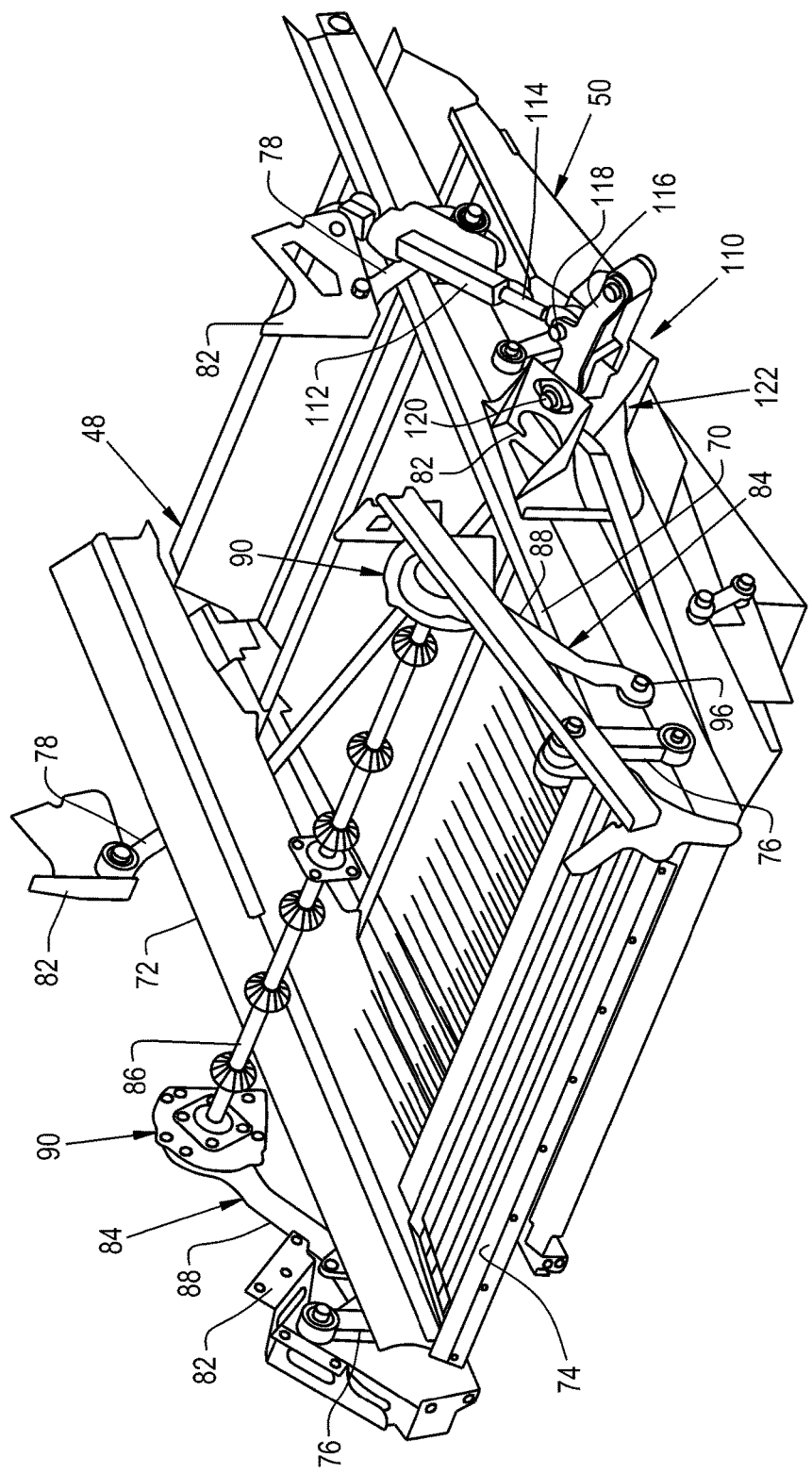
FIG. 2 is a perspective view of the sieve assembly shown in FIG. 1.

Referring now to FIG. 2, the upper and lower sieves or sieve assemblies 48 and 50 are shown. The upper sieve assembly 48 includes a left side member 70 and a right side member 72 interconnected by a cross member 74. The right and left side members 70 and 72 are supported adjacent the cross member 74 by a front link 76. A flexible link 78 connects to a rear support to maintain the rear of the side members in place. Links 76 and 78 have flexible mounting points 96 to enable both fore and aft and side to side movement. Support frames 82 provide a base affixed to the chassis 12 to provide ultimate support for the sieve assembly 48. A sieve extends between right and left side member 70 and 72 to provide a surface for carrying material in an aft direction and permit grain or other crop material to drop through and be collected. The sieve is not shown to enable a clearer description of the present invention.

The front of the right and left side members 70 and 72 is driven to fore and aft movement through a fore and aft oscillation mechanism generally indicated at 84. An input drive shaft 86 extending transverse in chassis 12 receives a suitable power input for rotation. Both ends of drive shaft drive 86 reciprocate arms 88 through an eccentric rotatable mounting 90. Arms 88 connect to the first and second side members 70, 72 through flexible connections 96.

The right and left side members 70 and 72 are selectively reciprocated from side to side by a side shaker mechanism generally indicated at 110. The mechanism includes a reciprocating electric actuator 112 appropriately mounted to frame 82 and having an output shaft 114 connecting to upper and lower links 116 by a pivotal input connection 118. The upper and lower links 116 are pivotally connected to the frame 82 at 120. A mechanical connection generally indicated at 122 connects to the left side member 70 and right side member 72 for side to side movement.

Figure 3:
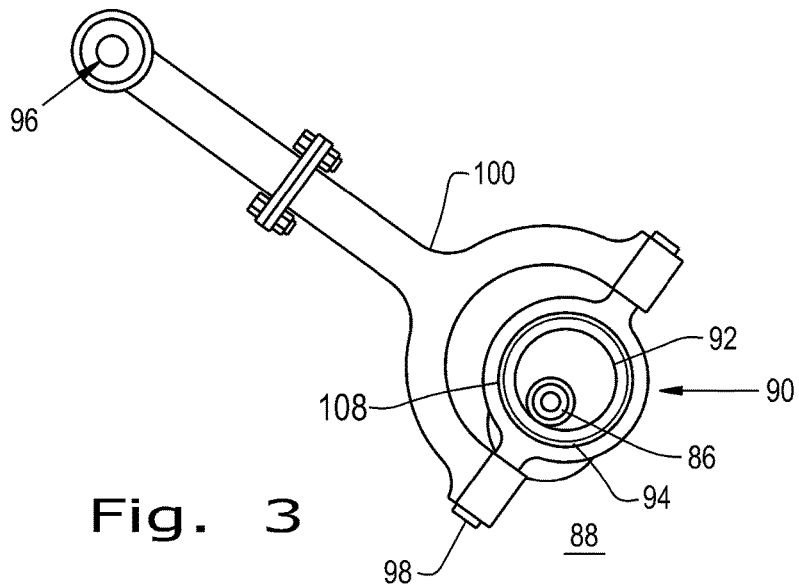
FIG. 3 is a view of one version of a drive arm embodying the present invention for the sieve of FIG. 2; and, FIG. 4 is a view of another version of a drive arm embodying the present invention for the sieve of FIG. 2.

The oscillation of the upper sieve 48 in a fore and aft direction must also accommodate a side to side movement by side shaker mechanism 110. In the past, complicated mechanisms, including multiple links, have been provided to accomplish this. In accordance with the present invention, the drive arm shown in FIG. 3 eliminates the complexities of the mechanism. Referring specifically to FIG. 3, the eccentric rotatable mounting 90 includes a lobe 92 having a circular outer face and connected to shaft 86 at a point that is radially outward from the axis of rotation of lobe 92. A bearing assembly 94 of either the roller bearing type or ball bearing type permitting limited axial movement has an inter race connected to the periphery of lobe 92 and an outer race received in an outer annular housing 108 having a pair of radially extending rods 98 received in a yoke member 100 ultimately connected to flexible mounting 96 on the side member 70 and 72. Thus, when the shaft 86 is rotated, the lobe 92 prescribes an eccentric motion which, coupled through the bearing 94, moves in a fore and aft fashion. However, the universal joint provided by the yoke 100 and rods 98 enables lateral movement of the left and right side members 70 and 72 through flexible mounting 96. This greatly simplifies the mechanism and allows a single link rather than the complex double link previously utilized. By simplifying the mechanical arrangement the drive is made extremely compact and enables installation in otherwise difficult overall product envelopes.

Figure 4:
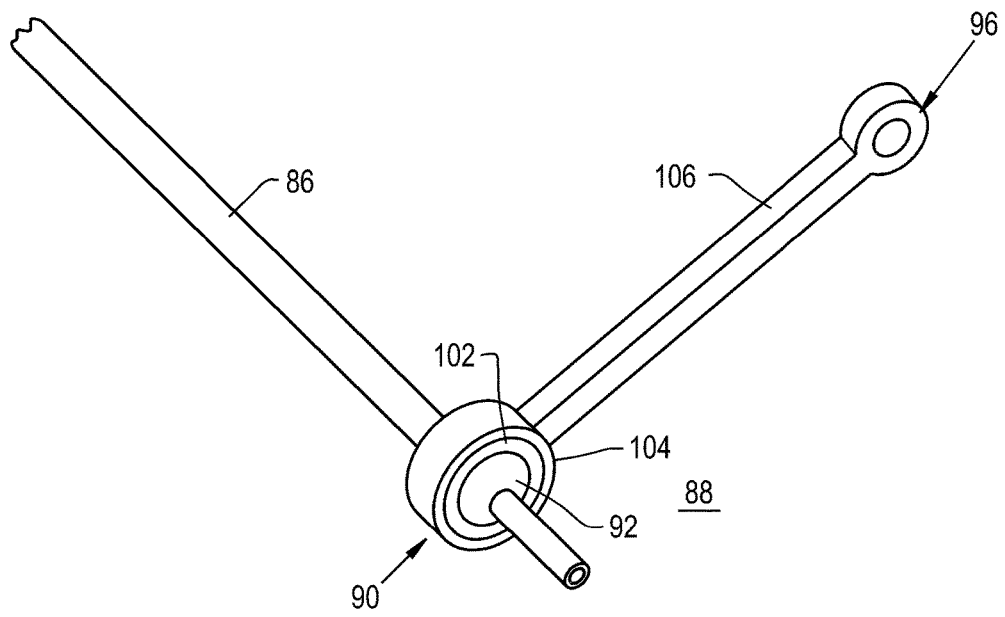

Another arrangement to provide a flexible mounting to the eccentric rotatable mounting 90 is shown in FIG. 4 in which a drive arm 88 includes a spherical bearing 102 having its inner race mounted on lobe 92 and its outer race mounted on an outer circular housing 104 integral with arm 106 extending to flexible mounting 96. In this embodiment, the rotation of eccentric lobe 92 produces fore and aft oscillation but the spherical bearing 102 permits side to side movement of the flexible mounting 96.

Still another embodiment is a standard ball or roller bearing having its inner race mounted on lobe 92 and a flexible annular outer ring of elastomeric material between the outer race of the bearing and a drive arm extending to flexible mounting 96.

Another embodiment is the use of a constant velocity (CV) joint at the interface between the drive arm and the lobe 92 and having an inner race connected to lobe 92 and an outer race connected to arm 88.

All of the arrangements above produce a robust and compact drive arm for the sieve in an agricultural harvester such as a combine. The elimination of intermediate lengths provides a compact installation between the eccentric mounting and the side members to be oscillated. This significantly reduces the overall envelope for the sieve assembly thus making it more adaptable for a variety of installations.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A sieve assembly for an agricultural harvester, said sieve assembly comprising:
   a right side member and a left side member interconnected by a cross frame;
   a rotatable shaft;
   an eccentric rotation device for driving fore and aft oscillation of said right and left side members, said eccentric rotation device including a lobe having a circular outer face and mounted eccentrically on the rotatable shaft;
   a drive arm connected to said eccentric rotation device and to each of said right and left side members; and
   a bearing assembly connecting said drive arm to said eccentric rotation device and including one of a ball and roller bearing having an inner race mounted on said lobe and an outer race received in an annular housing having a pair of radial extending rods pivotally connected to a yoke integral with said drive arm, permitting side to side movement and fore and aft oscillation.

2. The sieve assembly as claimed in claim 1, wherein said drive arm has a flexible connection to said right and left side members.

3. A harvester comprising:
   a main frame;
   a plurality of mobile wheels for ground movement;
   grain processing equipment mounted in said frame;
   a sieve assembly comprising a right side member and a left side member interconnected by a cross frame member, said cross frame member being positioned at the forward end of said right and left side members
   a rotatable shaft;
   an eccentric rotation device for driving fore and aft oscillation of said right and left side members, said eccentric rotation device including a lobe having a circular outer face and mounted eccentrically on the rotatable shaft;
   a drive arm connected to said eccentric rotation device and to each of said right and left side members; and
   a bearing assembly connecting said drive arm to said eccentric rotation device and including one of a ball and roller bearing having an inner race mounted on said lobe and an outer race received in an annular housing having a pair of radial extending rods pivotally connected to a yoke integral with said drive arm, permitting side to side movement and fore and aft oscillation.

4. The agricultural harvester as claimed in claim 3, wherein said drive arm has a flexible connection to said right and left side members.

5. A sieve assembly for an agricultural harvester, said sieve assembly comprising:
   a right side member and a left side member interconnected by a cross frame;
   a rotatable shaft;
   an eccentric rotation device for driving fore and aft oscillation of said right and left side members, said eccentric rotation device including a lobe having a circular outer face and mounted eccentrically on the rotatable shaft; and a drive arm connected to said eccentric rotation device and to each of said right and left side members, said drive arm connecting to said eccentric rotation device by a spherical bearing having an inner race mounted on said lobe and an outer race received in an annular housing integral with said drive arm, permitting side to side movement and fore and aft oscillation.

6. The sieve assembly of claim 5, wherein said drive arm has a flexible connection to said right and left side members.

* * * * *